April 22, 1952   J. W. ENGLAND   2,594,140
TWINE HOLDER
Filed Oct. 15, 1951
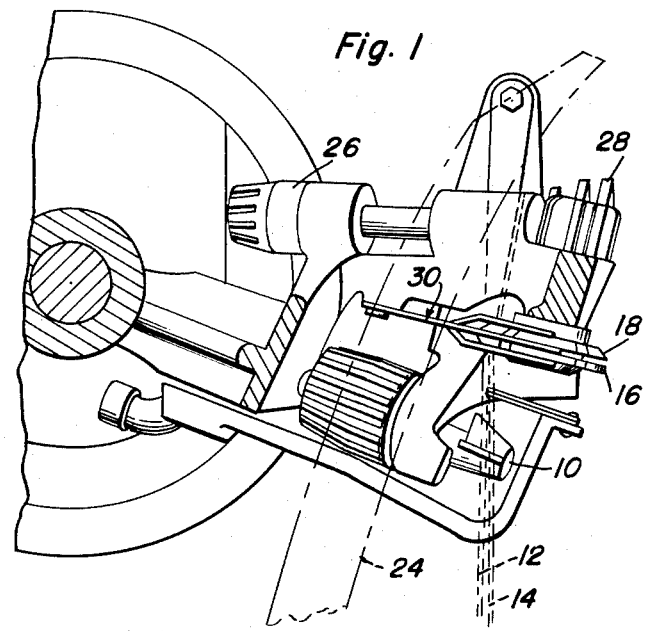
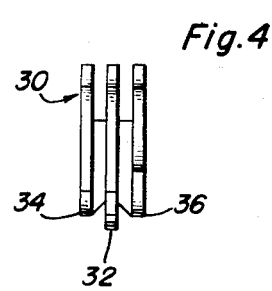
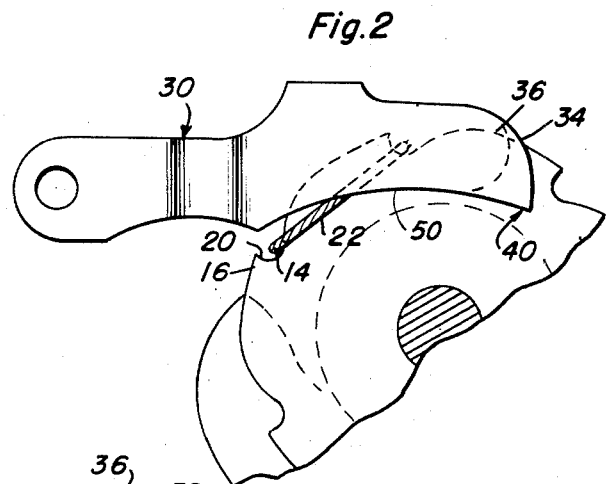
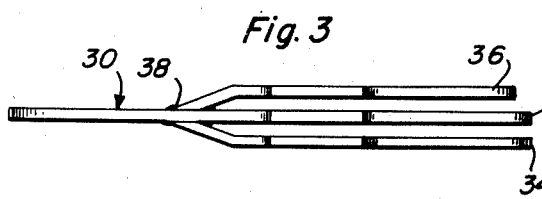
John W. England
INVENTOR.
BY *Clarence A. O'Brien*
*and Harvey B. Jacobson*
Attorneys Patented Apr. 22, 1952

2,594,140

UNITED STATES PATENT OFFICE 2,594,140

TWINE HOLDER

John W. England, Iowa Falls, Iowa

Application October 15, 1951, Serial No. 251,407

6 Claims. (Cl. 289—14)

This invention relates to a twine holder and particularly to an improved device for retaining the twine within the twine entraining disk of knotting devices.

In the utilization of knot tying devices on such devices as reapers and haybalers, etc., it is customary to retain the card or twine with which the bales or bundles are tied up in a twine entraining rotary disk in which a spring fastened finger assists in holding the cord or twine in the entraining disk. In heavy application, particularly in balers, difficulty is had because of the twine pulling out of the entraining disks, leaving loose bales when the same are dropped on the field.

The present invention provides a twine holder for cooperation with the twine engaging disk of the usual knotting device having sufficient twine engaging surface to prevent disengagement of the twine from the twine entraining disk. This is accomplished by providing, in addition to the usual central twine holding finger, a plurality of laterally spaced fingers extending over the outer circumference of the twine engaging disk so as to provide a plurality of twine engaging surfaces on the inner and outer sides of the twine engaging disk.

It is accordingly an object of this invention to provide an improved twine holder.

It is a further object of this invention to provide a twine holder having a plurality of fingers engaging both the inner and outer surfaces of the twine entraining disk. It is a further object of this invention to provide a twine holder having a plurality of fingers, one of which pre-releases the twine from the twine engaging disk.

Other objects and many of the attendant advantages of this invention will be found in the following detailed description, taken in conjunction with the accompanying drawing, in which:

Figure 1 is a perspective view of a portion of a knotter showing the improved twine holder in place;

Figure 2 is an enlarged side elevation of the twine holder in place on a twine entraining disk;

Figure 3 is an enlarged top plan view of the twine holder; and

Figure 4 is an end view of the twine holder.

In the exemplary embodiment of the invention, a knotting device includes a periodically operable bill hook for forming knots in a pair of cords forming the ends of a loop around a bale of material (not shown). Adjacent to bill hook 10 is a pair of twine entraining rotary disks 16 and 18 having peripheral notches 20 therein for retaining the bight 22 of the twine 14, said twine being presented to the peripheral notch 20 by means of a needle device 24. When the cord 14 is drawn across the periphery of the disks 16 and 18, the entraining wheels 16 and 18 are driven by an intermittent gear 26 by means of a worm 28 to advance the bight 22 under the pivoted twine holder 30, after which the tying cords are cut off and the needle retreats to lay the track for another bale. It has heretofore been customary to use a twine holder having a single finger received in the space between the entraining wheels 16 and 18. The present invention provides a twine holder arm 30 having a plurality of fingers including a central finger 32 which passes between or is received in the space between the entraining wheels 16 and 18 for the customary purpose of forcing the twine down in and between the disks where it is frictionally held. A pair of laterally spaced holding fingers 34 and 36 are rigidly attached to the holder 30 by suitable means such as welding 38. This pair of fingers 34 and 36 are parallel to and embrace the outer surfaces of the wheels 16 and 18 so that the twine is additionally held between the fingers 34 and 36 and the outer surface of the twine engaging wheels 16 and 18.

The surface of the fingers 32, 34 and 36 presented toward the periphery of the wheels 18 and 16 is provided with an arcuate engaging surface or edge 50 to facilitate the passage of the twine between the fingers and the gripping wheels. The fingers 32 and 34 are provided with hooked nose releases 40 for releasing the twine suddenly during the motion of the twine engaging wheels. However, the outside finger 36, that is, the side furtherest removed from the knotting element is provided with a rounded end to secure a pre-release of that twine that is still held by the needle and which will retreat to lay the new track for the coming bale.

In operation, the improved twine holder provides sufficient twine engaging surface to prevent the heavy operation from withdrawing the twine from the twine entraining disk.

While for purposes of illustration, a preferred embodiment has been shown and described according to the best present understanding thereof, it will be apparent that changes and modifications can be made therein, without departing from the true spirit of the invention.

Having described the invention, what is claimed as new is:

1. In a tying machine having a pair of spaced apart twine entraining rotary disks, said disks having peripheral twine receiving notches, said twine holder comprising an arm mounted adjacent the periphery of said disks, a central plate-like finger on said arm, said central finger extending between said disks, a pair of plate-like fingers rigidly secured in spaced parallel relation to said central finger, said pair of fingers lying adjacent the outer sides of said twine entraining disks.

2. In a tying machine having a pair of spaced apart twine entraining disks, said disks having peripheral twine receiving notches, a twine holder comprising an arm pivotally mounted adjacent the periphery of said disks, a central finger on said arm, said central finger extending between said disks, a pair of fingers rigidly secured in spaced parallel relation to said central finger, said pair of fingers engaging the outer sides of said twine entraining disks, the face of each of said fingers having an arcuate twine engaging surface or edge portion.

3. In a tying machine having a pair of spaced apart twine entraining disks, said disks having peripheral twine receiving notches, a twine holder comprising an arm pivotally mounted adjacent the periphery of said disks, a central finger on said arm, said central finger extending between said disks, a pair of fingers rigidly secured in spaced parallel relation to said central finger, said pair of fingers engaging the outer sides of said twine entraining disks, one of said fingers having a rounded end for initiating release of said twine.

4. A twine holder for use in a tying machine having a pair step by step twine engaging disks; said twine holder comprising a supporting arm having means adjacent one end for pivotally mounting the same and having a plate-like central presser finger extending therefrom and a pair of plate-like fingers mounted in spaced relation to said first presser finger, said pair of fingers having their adjacent longitudinal edges in the form of arcs.

5. A twine holder for use in a tying machine having a pair step by step twine engaging disks; said twine holder comprising a supporting arm having means adjacent one end for pivotally mounting the same and having a plate-like central presser finger extending therefrom and a pair of plate-like fingers mounted in spaced relation to said first presser finger, said pair of fingers having their adjacent longitudinal edges in the form of arcs, said first named presser finger and one of said pair of plate-like fingers being of substantially the same length and said other plate-like finger of said pair of fingers having a rounded end.

6. A twine holder for use in a typing machine having a pair step by step twine engaging disks; said twine holder comprising a supporting arm having means adjacent one end for pivotally mounting the same and having a plate-like central presser finger extending therefrom and a pair of plate-like fingers mounted in spaced relation to said first presser finger, said pair of fingers having their adjacent longitudinal edges in the form of arcs, said first named presser finger and one of said pair of plate-like fingers being of substantially the same length and each having a hooked nose, and said other plate-like finger of said pair of fingers having a rounded end.

JOHN W. ENGLAND.

REFERENCES CITED

The following references are of record in the file of this patent:

UNITED STATES PATENTS

| Number | Name | Date |
| --- | --- | --- |
| 314,056 | Remy | Mar. 17, 1885 |

FOREIGN PATENTS

| Number | Country | Date |
| --- | --- | --- |
| 410 | Great Britain | 1885 |
| 11,419 | Great Britain | 1888 |
| 497,474 | Great Britain | Dec. 20, 1938 |